Patented Sept. 2, 1947

2,426,598

UNITED STATES PATENT OFFICE 2,426,598

MANUFACTURING TETRAETHYL LEAD IN THE PRESENCE OF AN ANHYDRIDE

Willis Jackson Clem and Herman Podolsky, Wilmington, Del., assignors to E. I. du Pont de Nemours & Company, Wilmington, Del., a corporation of Delaware No Drawing. Application April 3, 1946,
Serial No. 659,424

5 Claims. (Cl. 260—437)

1

This invention relates to a process for manufacturing tetraethyl lead and more particularly to catalyzing the ethylation of lead monosodium alloy with ethyl chloride.

In the usual commercial process for manufacturing tetraethyl lead, ethyl chloride is reacted with lead monosodium alloy in a closed vessel under pressure at about 65° C. to about 85° C. This process ordinarily requires 5 or more hours to complete the reaction. In recent years, it has become important to very greatly increase the production of tetraethyl lead. In order to increase such production materially, it has become important and desirable to greatly decrease the time for carrying the reaction to completion. When it has attempted to decrease the time of reaction in the old processes, the yield of tetraethyl lead from a given batch of alloy is materially decreased and additional and difficult problems of separating the tetraethyl lead from the reaction mass have been encountered.

An object of the present invention is to provide a process whereby the speed of the reaction is materially increased without a substantial decrease in the yield. Another object is to provide a process whereby the time for completion of the reaction may be greatly decreased with a resulting large increase in the production of tetraethyl lead. A further object is to provide new and improved catalysts for the reaction of ethyl chloride with lead monosodium alloy. Other objects are to advance the art. Still other objects will appear hereinafter.

The above and other objects may be accomplished in accordance with our invention which comprises carrying out the reaction of ethyl chloride on lead monosodium alloy, in the presence of a small proportion, sufficient to accelerate the reaction, of an anhydride of a carboxylic acid, which anhydride contains a single

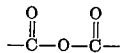

group and otherwise consists of carbon and hydrogen. We have found that such anhydrides are extremely effective catalysts for this reaction, increasing the speed of the reaction to such an extent that the time required for completion of the reaction is reduced to about one hour. At

2 the same time, high yields of tetraethyl lead are obtained and the difficulty of separating the tetraethyl lead from the reaction mass is not increased. Thereby, the production of tetraethyl lead in a plant is very materially speeded and increased.

We have found that the members of the above defined class of anhydrides are, as a whole, very effective for accelerating the reaction. The anhydride may be aromatic, alicyclic or acyclic. Preferably, the anhydride is aliphatic. The term "aliphatic" as employed herein is employed in the strict sense to mean an open chain and to exclude aromatic and like substituents. The anhydrides may be those of saturated or unsaturated carboxylic acids which may contain 0 to 1 benzene ring. Preferably, the aromatic anhydrides are derived from acids which contain a single benzene ring. The term "anhydride oxygen" will be understood to mean the oxygen atoms which form the

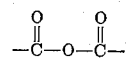

group.

Anhydrides which have been found to be effective to accelerate this reaction are as follows:

Acetic anhydride
Propionic anhydride
Butyric anhydride
Benzoic anhydride
Phthalic anhydride The amount of the anhydride employed may be varied widely and will depend upon the conditions employed and particularly on the size of the batches and the equipment. Generally, they will be employed in the proportion of from about 0.6% to about 3.2%, based on the ethyl chloride. Usually, in large scale plant production in an autoclave, smaller proportions of the anhydrides will be effective and may even be desirable.

While the anhydride may be added to the reactants or to the reaction vessel in any desired manner and at any desired stage of the process, it will generally be most desirable to add the anhydride to the ethyl chloride prior to mixing the ethyl chloride with the alloy. The process of making tetraethyl lead will remain unchanged, except for the addition of the anhydride and the shorter time required for the completion of the process.

In order to more clearly illustrate our invention, preferred modes of carrying the same into effect and the advantageous results to be obtained thereby, the following examples are given:

Example I

Approximately 100 g. of lead-sodium alloy (containing 10.0% sodium) of a size which passed a 4 mesh screen and was retained on a 10 mesh screen, was charged into each of five steel bombs having a capacity of 150 ml. Fifty milliliters of ethyl chloride was added to each bomb and 0.51 cc. of acetic anhydride was added to each of three of them. The bombs were closed and tumbled in a water-bath maintained at 85° C. for 90 minutes. After the heating period, the hot water was drained and the bath was refilled with cold water. After 15 minutes, the bombs were removed and placed on ice.

Each reaction mass was extracted with 2000 ml. of benzene. A 50 ml. aliquot of the benzene solution was titrated with iodine solution to determine the yield of tetraethyl lead. The yields, in the three bombs containing acetic anhydride, were 83.26%, 84.72% and 85.27% while the yields in the other two were 81.80% and 83.21%.

Example II

Experiments were run as in Example I, employing different proportions of butyric anhydride as shown in the following table wherein "Average yield" represents the average of two to three determinations in each case.

Table

| Accelerator | Amount | Average yield |
|---|---|---|
| | Cc. | |
| Butyric anhydride | 0.6 | 87.4 |
| Do | 0.8 | 89.3 |
| Do | 1.0 | 88.9 |
| None (control) | | 73.5 |

It will be understood that our invention is not to be limited to the specific embodiments disclosed, but that our invention may be modified in various respects without departing from the spirit or scope thereof. For example, other anhydrides, within the class hereinbefore defined, may be substituted for those specifically disclosed herein.

We claim:

1. In the process of making tetraethyl lead by the reaction of ethyl chloride on lead monosodium alloy, the improvement which comprises carrying out the reaction in the presence of a small proportion, sufficient to accelerate the reaction, of an anhydride of a carboxylic acid, which anhydride contains a single

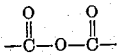

group and otherwise consists of carbon and hydrogen.

2. In the process of making tetraethyl lead by the reaction of ethyl chloride on lead monosodium alloy, the improvement which comprises carrying out the reaction in the presence of a small proportion, sufficient to accelerate the reaction, of an anhydride of a carboxylic acid containing 0 to 1 benzene ring and which anhydride contains a single

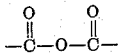

group and otherwise consists of carbon and hydrogen.

3. In the process of making tetraethyl lead by the reaction of ethyl chloride on lead monosodium alloy, the improvement which comprises carrying out the reaction in the presence of a small proportion, sufficient to accelerate the reaction, of an anhydride of an aliphatic carboxylic acid, which anhydride contains a single

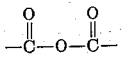

group and otherwise consists of carbon and hydrogen.

4. In the process of making tetraethyl lead by the reaction of ethyl chloride on lead monosodium alloy, the improvement which comprises carrying out the reaction in the presence of a small proportion, sufficient to accelerate the reaction, of an anhydride of an aromatic carboxylic acid containing a single benzene ring and which anhydride contains a single

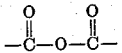

group and otherwise consists of carbon and hydrogen.

5. In the process of making tetraethyl lead by the reaction of ethyl chloride on lead monosodium alloy, the improvement which comprises carrying out the reaction in the presence of a small proportion, sufficient to accelerate the reaction, of butyric anhydride.

WILLIS JACKSON CLEM.
HERMAN PODOLSKY.